United States Patent [19]
Chang

[11] Patent Number: 5,980,370
[45] Date of Patent: Nov. 9, 1999

[54] SAW HAVING COATED ABRASIVE CABLE

[76] Inventor: Chun Yuan Chang, 5F-1, No. 81, Sec. 2, Chern Der Road, Taipei, Taiwan

[21] Appl. No.: 09/078,648

[22] Filed: May 14, 1998

[51] Int. Cl.[6] .................................................. B24B 23/00
[52] U.S. Cl. ......................... 451/344; 451/524; 451/557; 125/16.02; 30/507
[58] Field of Search .................................. 451/524, 557, 451/499, 500, 514, 344; 30/507, 509, 517, 166.3, 276; 125/16.02

[56] References Cited

U.S. PATENT DOCUMENTS

| | | | |
|---|---|---|---|
| 2,004,580 | 6/1935 | Meyer | 219/29 |
| 4,464,836 | 8/1984 | Hissa | 30/92 |
| 5,271,158 | 12/1993 | Chen | 30/508 |
| 5,363,558 | 11/1994 | Schroeder | 30/380 |
| 5,388,334 | 2/1995 | Halsey | 30/509 |
| 5,524,350 | 6/1996 | Boland | 30/347 |

*Primary Examiner*—Timothy V. Eley
*Assistant Examiner*—Dung Van Nguyen

[57] ABSTRACT

A saw includes a C-shaped frame having a C-shaped channel and having a beam and an arm dependent downward from the front portion of the beam and a handle secured to the rear portion of the beam. An endless abrasive coating cable is engaged in the channel of the frame and includes an exposing portion disposed between the arm and the handle. A fastener is secured to the lower portion of the arm and includes a passage for receiving the cable and for securing the cable to the frame.

4 Claims, 4 Drawing Sheets

SAW HAVING COATED ABRASIVE CABLE

BACKGROUND OF THE INVENTION

1. Field of the Invention

The present invention relates to a saw, and more particularly to a saw having a coated abrasive cable.

2. Description of the Prior Art

Typical saws comprise a C-shaped frame and a saw blade secured to the frame. The saw blade is normally strip shaped and includes a thickness such that the frame should be maintained in a particular direction while sawing an object with such a saw blade. The saw blade will be easily damaged or broken when the frame is tilted or is rotated for an angle.

The present invention has arisen to mitigate and/or obviate the afore-described disadvantages of the conventional saws.

SUMMARY OF THE INVENTION

The primary objective of the present invention is to provide a saw having a coated abrasive cable for conducting sawing operations.

In accordance with one aspect of the invention, there is provided a saw comprising a frame including a C-shaped channel and including a beam having a front portion and a rear portion, the frame including an arm dependent downward from the front portion of the beam and including a handle secured to the rear portion of the beam, the channel being formed in the beam and the arm and the handle, an endless abrasive coating cable engaged in the channel of the frame and including an exposing portion provided between the arm and the handle, and means for securing the cable to the frame.

The arm includes a lower portion having a puncture, the securing means includes a fastener having a passage formed therein for receiving the cable, the fastener is engaged in the puncture of the arm and secured to the arm for securing the cable in place. The cable may be released and rotated for exposing the other portion of the cable which includes an abrasive coating that has not been worn out. The cable includes two ends secured together at a knot or by any other securing member for forming the endless structure of the cable.

The fastener includes a bolt having an outer thread, and a nut engaged with the outer thread of the bolt for securing the fastener to the arm and for tightening the cable in place, the cable is released when the fastener is released.

The handle includes a lower portion having an orifice formed therein, and a guide secured in the orifice and having an aperture formed therein for receiving the cable. The lower portion of the handle includes an opening communicating with the orifice and the C-shaped channel for allowing the guide to be engaged into the orifice of the handle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
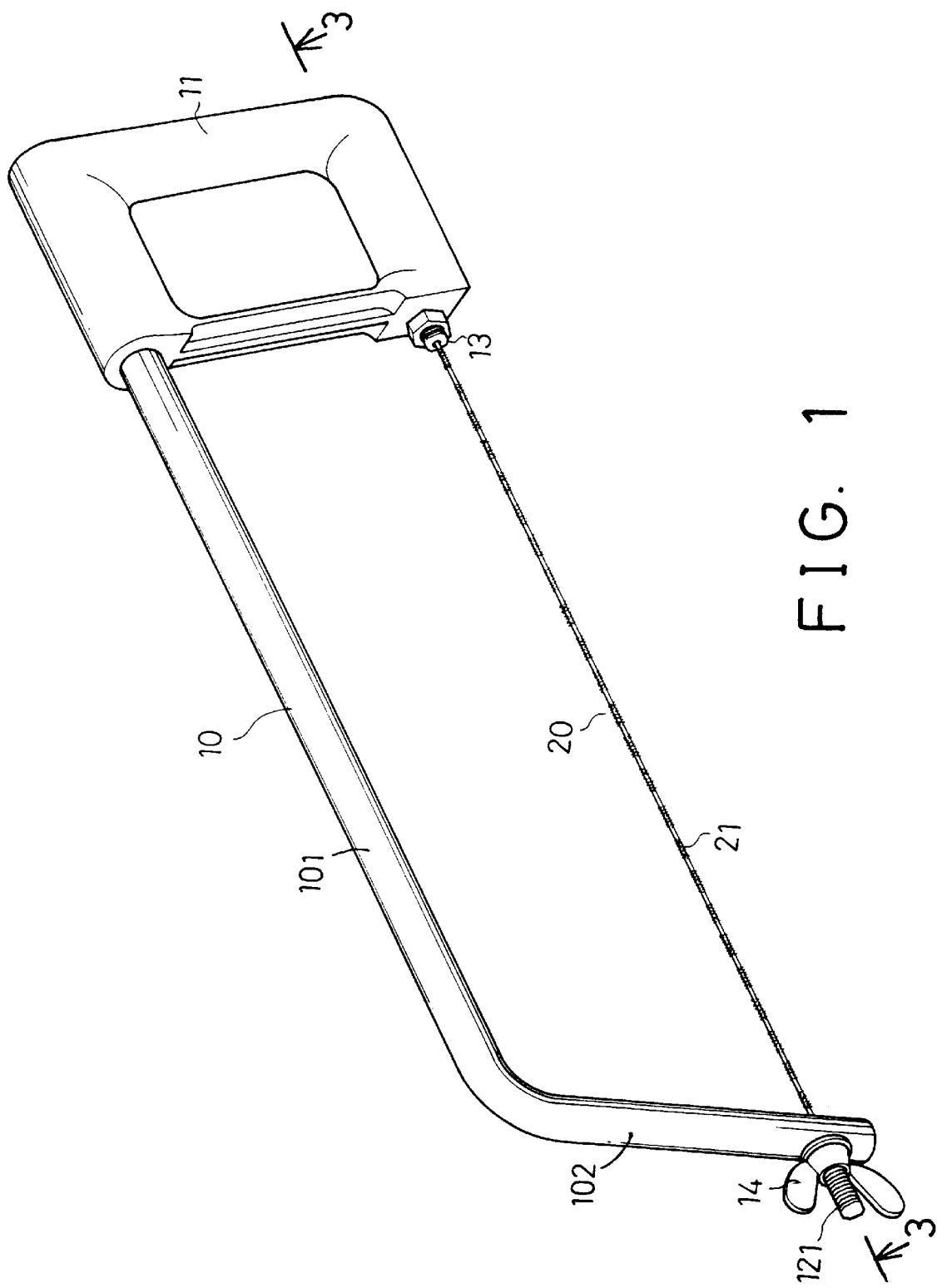
FIG. 1 is a perspective view of a saw in accordance with the present invention.
Figure 2:
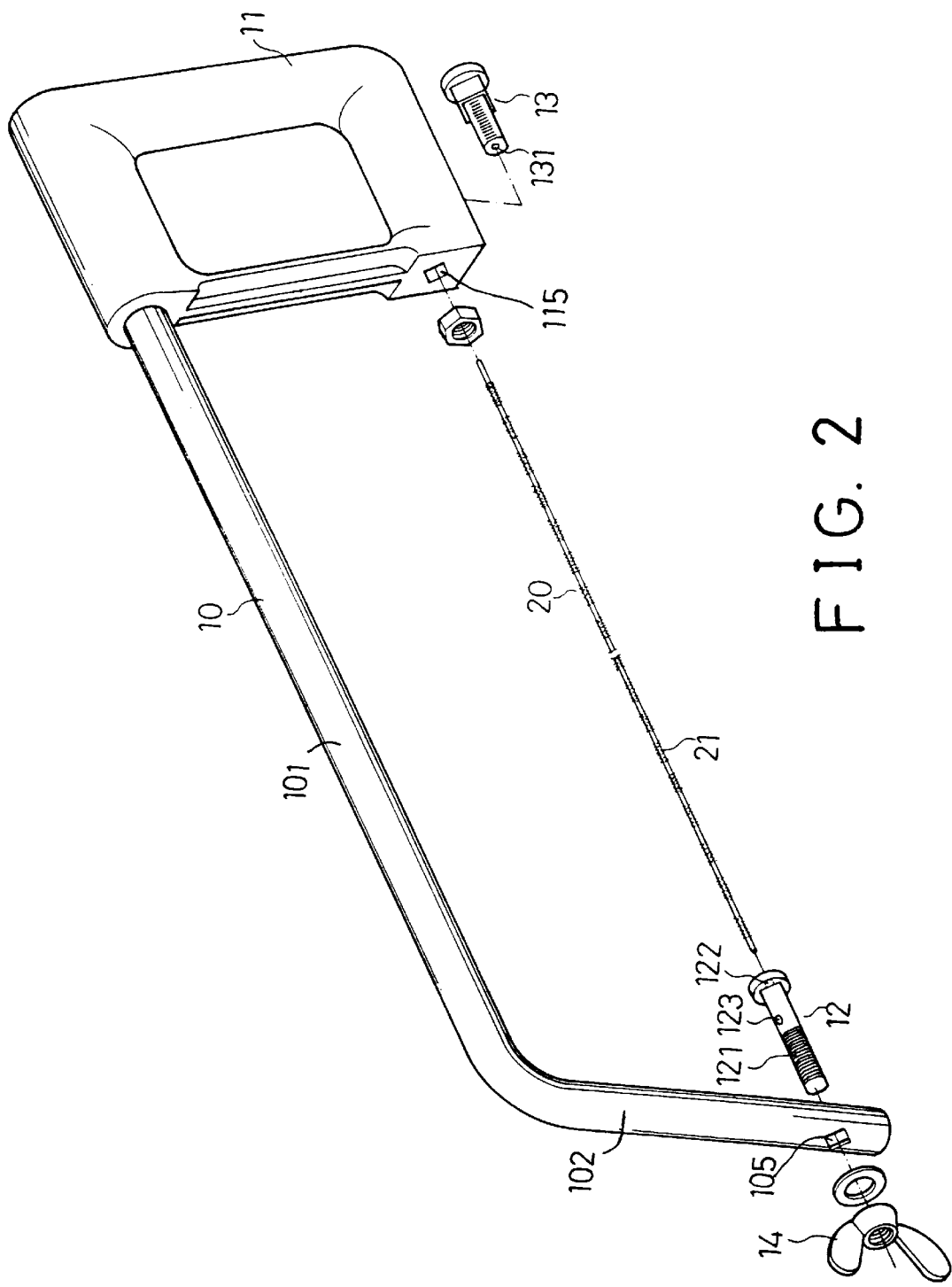
FIG. 2 is a partial exploded view of the saw.
Figure 3:
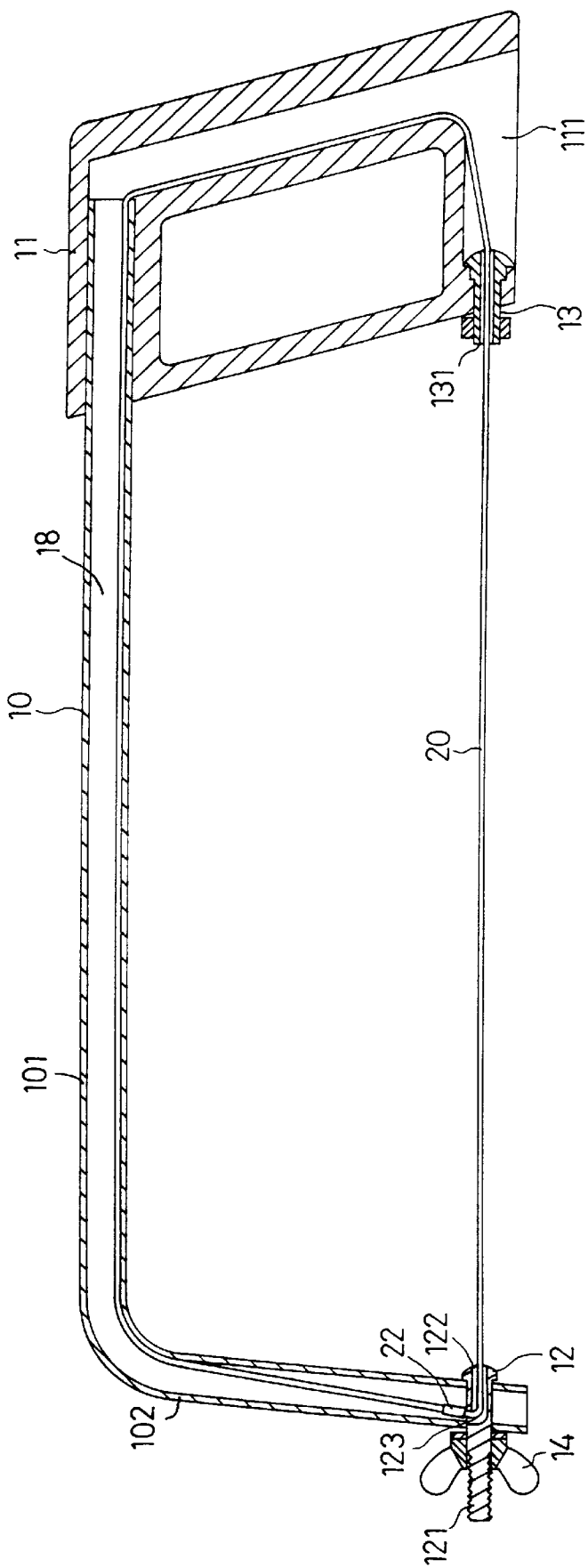
FIG. 3 is a cross sectional view taken along lines 3—3 of FIG. 1.

Referring to the drawings, and initially to FIGS. 1–3, a saw in accordance with the present invention comprises a C-shaped frame 10 having a beam 101 and an arm 102 dependent downward from the front portion of the beam 101 and a handle 11 secured to the rear portion of the beam 101. The frame 10 includes a C-shaped channel 18 formed therein for receiving a loop-shaped coated abrasive cable 20. The handle 11 includes a bottom portion having an orifice 115 and an opening 111 communicating with the C-shaped channel 18. A guide 13, such as a bolt, is engaged in the orifice 115 and secured to the handle 11 with a nut. The guide 13 includes an aperture 131 for slidably receiving the cable 20. The opening 111 is provided for engaging the guide 13 into the orifice 115. The cable 20 includes two ends secured together at a knot 22 (FIG. 3) or by any fixing member for forming an endless structure.

The arm 102 includes a puncture 105 formed in the bottom portion for engaging with a fastener 12, such as a bolt, which includes an outer thread 121 for engaging with a wing nut 14 and for securing the fastener 12 to the arm 102. The fastener 12 includes a passage 122 and a groove 123 communicating with each other for slidably receiving the cable 20 (FIG. 3). The fastener 12 may be solidly secured to the arm 102 by the wing nut 14 in order to tighten the cable 20 and in order to retain the cable 20 in place. The cable 20 thus includes an exposed portion defined between the handle 11 and the arm 102 for sawing purposes. The cable 20 includes an abrasive coating 21 of such as carbide particles, or diamond dust. The guide 13 is provided for receiving the cable 20 and for preventing the cable 20 from being cut by the sharp edges that form the orifice 115 of the handle 11.

Figure 4:
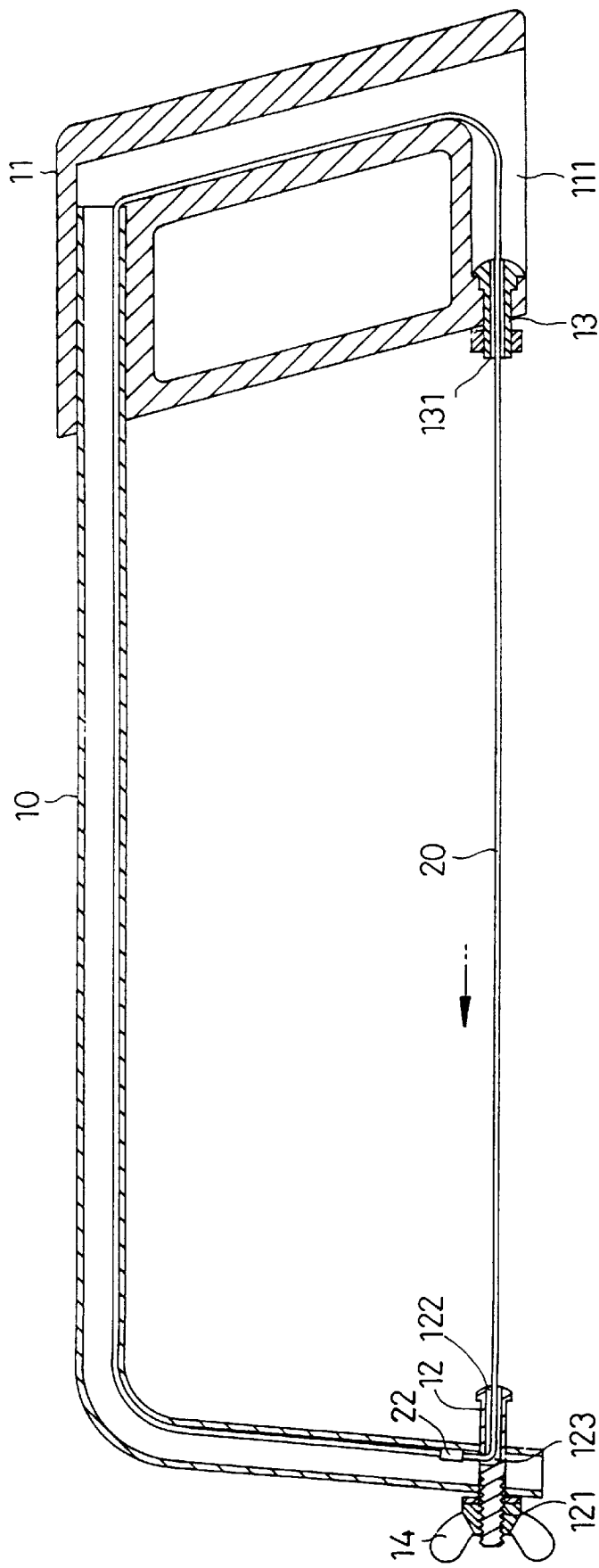
FIG. 4 is a cross sectional view similar to FIG. 3, illustrating the operation of the saw.

In operation, as shown in FIG. 3, the cable 20 may be tightly retained in place by the fastener 12 when the fastener 12 is solidly secured to the arm 102 by the wing nut 14. The abrasive cable 20 may be used for conducting sawing operation despite of the rotation of the frame 10 relative to the cable 20; i.e., the frame is not required to be maintained at a particular or selected direction while conducting the sawing operation. As shown in FIG. 4, when the abrasive coating 21 is worn out or when it is required to replace a new cable 20, the fastener 12 is released by releasing the nut 14, the cable 20 may be replaced with a new one or may be rotated for exposing the other portion of the cable 20 that includes excellent abrasive coating 21 thereon. The cable 20 may be secured in place again by the fastener 12 and the nut 14.

Accordingly, the saw in accordance with the present invention includes a coated abrasive cable for conducting sawing operations and for allowing the cable to be rotated for exposing different portion of the cable that may be used for conducting sawing operation.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A saw comprising:

a frame including a C-shaped channel and including a beam having a front portion and a rear portion, said frame including an arm dependent downward from said front portion of said beam and including a handle secured to said rear portion of said beam, said channel being formed in said beam and said arm and said handle, an endless abrasive coating cable engaged in said channel of said frame and including an exposing portion provided between said arm and said handle, and means for securing said cable to said frame, said arm including a lower portion having a puncture, said securing means including a fastener having a passage formed therein for receiving said cable, said fastener being engaged in said puncture of said arm and secured to said arm for securing said cable in place.

2. A saw comprising:

a frame including a C-shaped channel and including a beam having a front portion and a rear portion, said frame including an arm dependent downward from said front portion of said beam and including a handle secured to said rear portion of said beam, said channel being formed in said beam and said arm and said handle, an endless abrasive coating cable engaged in said channel of said frame and including an exposing portion provided between said arm and said handle, and means for securing said cable to said frame, said fastener including a bolt having an outer thread, and a nut engaged with said outer thread of said bolt for securing said fastener to said arm and for tightening said cable in place, said cable being released when said fastener is released.

3. A saw comprising:

a frame including a C-shaped channel and including a beam having a front portion and a rear portion, said frame including an arm dependent downward from said front portion of said beam and including a handle secured to said rear portion of said beam, said channel being formed in said beam and said arm and said handle, an endless abrasive coating cable enraged in said channel of said frame and including an exposing portion provided between said arm and said handle, and means for securing said cable to said frame, said handle including a lower portion having an orifice formed therein, and a guide secured in said orifice and having an aperture formed therein for receiving said cable.

4. The saw according to claim 3, wherein said lower portion of said handle includes an opening communicating with said orifice and said C-shaped channel for allowing said guide to be engaged into said orifice of said handle.

* * * * *